United States Patent [19]
Piepho

[11] 3,843,214
[45] Oct. 22, 1974

[54] ADJUSTABLE TRACK ROLLER ASSEMBLY
[75] Inventor: Donald A. Piepho, Aurora, Ill.
[73] Assignee: Caterpillar Tractor Co., Peoria, Ill.
[22] Filed: Oct. 12, 1972
[21] Appl. No.: 296,955

[52] U.S. Cl............... 305/14, 305/28, 308/18
[51] Int. Cl............................................. B62d 55/20
[58] Field of Search....... 308/18, 109, 211; 305/28, 305/14

[56] References Cited
UNITED STATES PATENTS

| | | | |
|---|---|---|---|
| 2,690,933 | 10/1954 | Bechman | 308/18 |
| 2,877,059 | 3/1959 | Williams | 305/28 |
| 2,906,564 | 9/1959 | Richardson | 305/28 A |
| 3,147,048 | 9/1964 | Johnson | 305/28 |
| 3,662,847 | 5/1972 | Skanes | 305/28 |

Primary Examiner—Philip Goodman
Attorney, Agent, or Firm—Phillips, Moore, Weissenberger Lempio & Strabala

[57] ABSTRACT

A track roller assembly for track-type vehicles has a shaft rotatably mounting an annular track-engaging rim thereon by axially spaced, tapered roller bearings. An annular flange is formed on the shaft to engage an outboard side of the inner race of one of the bearings and cooperates with an end plate releasably attached to an opposite end of the shaft to preload the bearings. A plurality of removable shims are positioned axially between an end of the shaft and the plate member for selectively adjusting bearing preload by changing the axial length between the annular flange and end plate upon removal of one or more of the shims.

12 Claims, 3 Drawing Figures

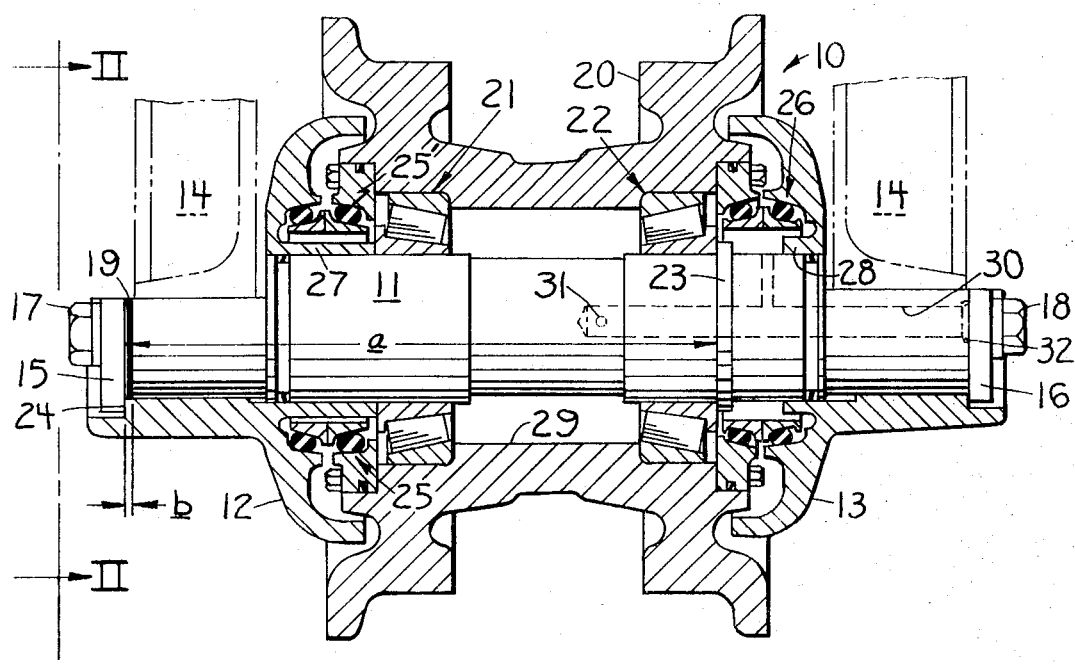
Fig_1_
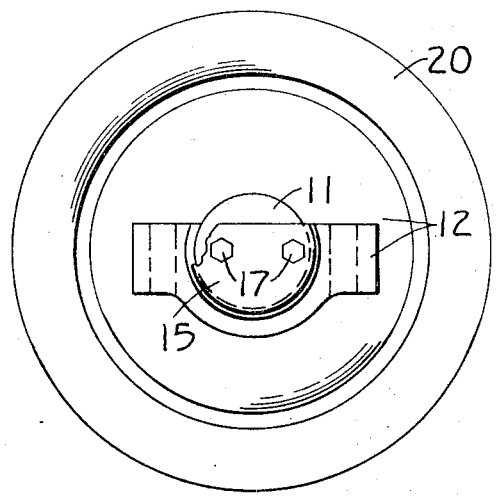
Fig_2_

ADJUSTABLE TRACK ROLLER ASSEMBLY

BACKGROUND OF THE INVENTION

Conventional track-type tractors oftentimes utilize sleeve-type bearings which are durable, adjustment-free and relatively inexpensive to manufacture and install. The advent of high-speed tractors has inherently induced a high rate of bearing wear, requiring dismantlement of the track rollers for bearing replacement purposes. Although the life expectancy of roller-type bearings is greater than that of sleeve-type bearings, they require periodic adjustment to compensate for "end-play" which is created during normal tractor operation. Such adjustment normally requires the complete dismantlement of the track roller assembly, resulting in substantial tractor down-time and monetary losses.

SUMMARY OF THIS INVENTION

An object of this invention is to overcome the above, briefly described problems by providing an economical and non-complex adjustable roller assembly which is adapted for the expeditious adjustment of the preload applied to axially spaced first and second annular bearing means employed therein. The bearing means rotatably mount a roller on a shaft which is, in turn, mounted on a stationary support. First abutment means, secured to the shaft, abut an outboard side of the second bearing means to urge such bearing means towards the first bearing means. Releasable second abutment means, positioned outboard of the first bearing means, abuts the support to selectively change the fixed axial length between the first and second abutment means. Removable shim means, positioned axially between the shaft and the second abutment means, may be selectively removed to reduce such length to impart a predetermined preload to the bearing means. In the preferred embodiment of this invention, the adjustable roller assembly comprises a track roller assembly adapted for use in a track-type vehicle.

BRIEF DESCRIPTION OF THE DRAWINGS

Other objects of this invention will become apparent from the following description and accompanying drawings wherein:

FIG. 1 is a longitudinal section of a track roller assembly embodying this invention;

FIG. 2 is an end elevational view of the track roller assembly, taken in the direction of arrows II—II in FIG. 1.

DETAILED DESCRIPTION

Figure 3:
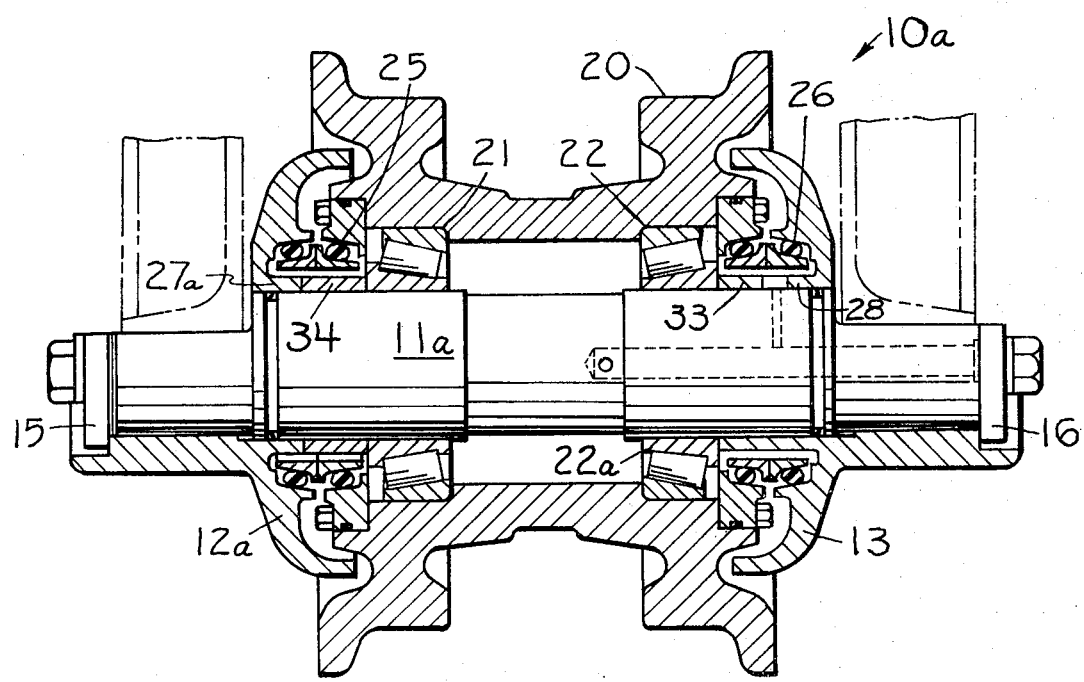
FIG. 3 is a longitudinal section similar to FIG. 1, but illustrating a modified track roller assembly.

Referring to FIG. 1, an adjustable track roller assembly 10, adapted for employment in a track-type vehicle, comprises a stationary shaft 11 supported at its reduced ends by annular members 12 and 13, secured to a support frame 14 of the vehicle. End plates 15 and 16 are releasably attached to opposite ends of the shaft by cap screws 17 and 18, respectively. A plurality of stacked shims 19 are positioned axially between an end of the shaft and end plate 15 for bearing preload adjustment purposes hereinafter explained.

A track roller 20 is rotatably mounted on the shaft by axially spaced first and second annular bearing means 21 and 22, respectively. Each bearing means preferably comprises a tapered roller bearing assembly having its inner race mounted on the shaft and its outer race mounted in track roller 20. A flange 23 is formed on the shaft to abut an outboard side of second bearing means 22 to urge the second bearing means and roller towards the first bearing means. The flange comprises first abutment means which cooperates with second abutment means, comprising end plate 15 which abuts a shoulder 24 formed on member 12, to selectively change a fixed axial distance $a$ between the two abutment means.

Annular face seal assemblies 25 and 26 are positioned on the outboard sides of bearing means 21 and 22, respectively, and may be of the type disclosed in U.S. Pat. No. 3,180,648, for example. Sealing assembly 25 is mounted around an annular collar portion 27 of member 12 which extends axially inwardly to abut the outboard side of the inner race of bearing means 21. Member 13 has a similar annular collar portion 28 which extends axially inwardly towards second bearing means 22, but terminates short thereof.

Lubricating means for continuously lubricating bearing means 21 and 22 during track roller operation comprises a chamber 29 adapted to be filled with a lubricating oil via a centrally disposed fill or rifle passage 30 and at least one radial port 31 formed in shaft 11. The open end of the passage is normally closed by closure means comprising end plate 16 and an O-ring seal 32.

FIG. 3 illustrates a modification of the FIG. 1 track roller assembly wherein like numerals are employed to depict corresponding constructions with some FIG. 3 numerals, depicting modifications, being accompanied by a small $a$. In this embodiment, flange 23 (FIG. 1) has been removed and a cylindrical sleeve 33 has been secured on the shaft, substituted therefor to comprise the above-described first abutment means. In particular, the sleeve is positioned between annular collar portion 28 of member 13 and an outboard side of second bearing means 22 to urge the second bearing means towards first bearing means 21. In addition, a second cylindrical sleeve 34 may be positioned in abutting relationship between a reduced annular collar portion 27a of a member 12a and an outboard side of the inner race of bearing means 21. The remaining constructions are identical to those shown in FIG. 1, as depicted by the corresponding numerals.

After extended operation of the FIG. 1 track roller assembly has resulted in the occurrence of track roller end-play on bearing means 21 and 22, end plates 15 and 16 would be detached from shaft 11 and one or more of shims 19 would be removed. The removed shims would be stored or discarded and the end plate 15 would again be secured to the shaft. The composite adjustable tolerance is depicted by $b$ in FIG. 1. The thickness of the removed shim or shims would thus be subtracted from the original fixed axial length $a$, between first and second abutment means 23 and 15, respectively, to provide a slightly (e.g., 0.004 in.) reduced axial length $a$.

Upon securances of caps screws 17 to shaft 11, collar 18 and roller 10 will automatically move rightwardly the adjusted amount to, in turn, take up the end play of bearing mns 21 and 22. In particular, plate 15 would urge member 12 rightwardly and through its collar portion 27 would move bearing 21 and roller 20 to simultaneously tighten bearing 22. Adjustment and tightening of both bearings 21 and 22 conveniently from the accessible outer sides of the roller frames would in like manner, increase compression of each elastomeric O-ring of the seal assemblies 25 and 26 such that seal rings 25a and 26a remain uniformly loaded. Adjustment of the FIG. 3 embodiment is accomplished in a similar manner with cylindrical sleeve 33 functioning to fixedly retain the inner race of bearing 22 as member 12, plate 15 and bolts 17 urge the roller assembly rightwardly.

What is claimed is:

1. An adjustable roller assembly comprising
a shaft mounted on a stationary support,
a roller,
axially spaced first and second annular bearing means, each having inner and outer races, rotatably mounting said roller on said shaft,
first abutment means solely abutting an outboard side of the inner race of said second bearing means for urging said second bearing means towards said first bearing means,
releasable second abuttment means, positioned outboard of said first bearing means, abutting said support to selectively fix the axial length between said first and second abutment means, and
removable shim means positioned axially between said shaft and said second abutment means for selectively imposing a predetermined preload on said bearing means by adjusting the axial length between said first and second abutment means.

2. The invention of claim 1 wherein said roller constitutes a track roller adapted to engage an endless track of a track-type vehicle.

3. The invention of claim 1 wherein each of said first and second bearing means comprises a tapered roller bearing assembly having its inner race mounted on said shaft and its outer race mounted in said roller.

4. The invention of claim 1 further comprising annular sealing means mounted between said support and said roller on the outboard side of each of said first and second bearing means.

5. The invention of claim 1 wherein said first abutment means comprises a radial flange secured on said shaft.

6. The invention of claim 1 wherein said first abutment means comprises an annular collar member mounted on said shaft.

7. The invention of claim 1 wherein said second abutment means comprises an end plate removably attached to a first end of said shaft.

8. The invention of claim 7 further comprising a recess formed at an end of said support and wherein a portion of said end plate is deposed in said recess.

9. The invention of claim 7 further comprising a second one of said end plates removably attached to an opposite, second end of said shaft.

10. The invention of claim 1 further comprising lubricating means for continuously communicating lubricating oil to said first and second bearings during roller assembly operation.

11. The invention of claim 10 wherein said lubricating means comprises a centrally disposed annular chamber defined between said first and second bearing means, said roller and said shaft.

12. The invention of claim 11 wherein said lubricating means further comprises a fill passage formed in said shaft, at least one radial port communicating said passage with said chamber and closure means removably attached to an end of said shaft to normally close an end of said passage.

* * * * *